(No Model.)
S. SAWYER.
WATCH MAKER'S LATHE.
No. 280,867. Patented July 10, 1883.
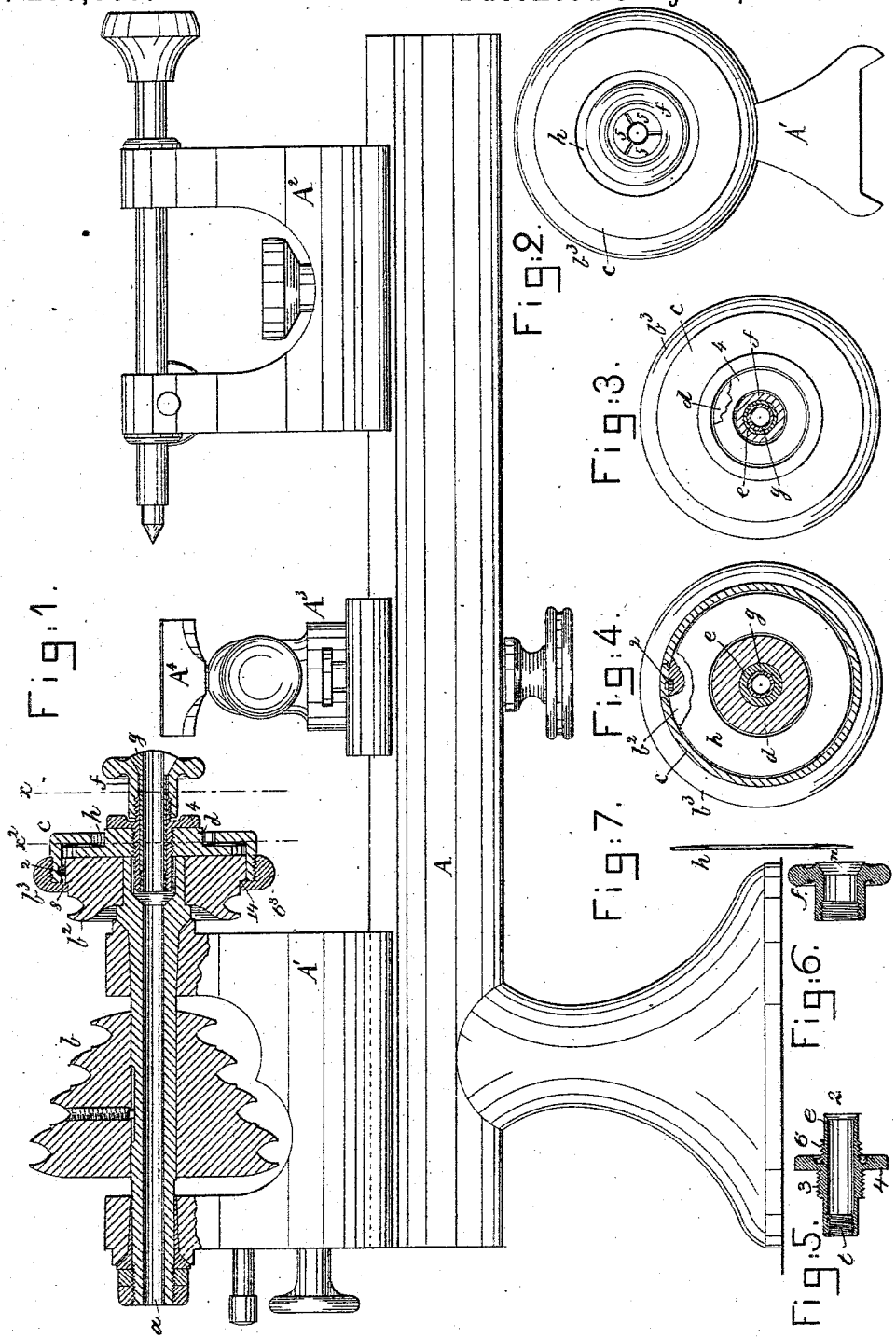
Witnesses
Fred A. Powell,
John F. C. Prinkert
Inventor.
Sylvanus Sawyer
By Crosby & Gregory, atty's

UNITED STATES PATENT OFFICE.

SYLVANUS SAWYER, OF FITCHBURG, MASSACHUSETTS.

WATCH-MAKER'S LATHE.

SPECIFICATION forming part of Letters Patent No. 280,867, dated July 10, 1883.

Application filed February 16, 1883. (No model.)

*To all whom it may concern:*

Be it known that I, SYLVANUS SAWYER, of Fitchburg, county of Worcester, State of Massachusetts, have invented an Improvement in Watch-Makers' Lathes, of which the following description, in connection with the accompanying drawings, is a specification.

This invention relates to an improved centering-chuck for watch-makers and other lathes, and a wire-holding chuck to be carried thereon, and to means for holding and clamping the tool-holding plate, as will be hereinafter described.

The chuck herein shown is an improvement on that represented in United States Patent No. 220,291. In that patent the tool-holding plate was fixed in place by a follower operated by a tightening-screw extended through the center of the spindle, and the said tool-holding plate was pressed outward against the clamping-cap, whereas in my invention the interior of the spindle is left unobstructed, and the said plate is pressed against the head of the chuck, which enables me to do away with a number of separate pieces shown in the said patent, and also enables me to hold and operate upon the end of a long piece of wire being passed through the hollow spindle. The head of the chuck has an annular shoulder back of which is placed a threaded loose clamping-nut, which engages the clamping-cap of the chuck and draws it toward the head to confine the tool-holding plate in its adjusted position, there being between the plate and clamping-cap a spring-washer to retain the former from radial or lateral movement in the clamping-cap and on the head, except when moved positively.

The wire-holding chuck is composed of a sleeve threaded externally at one end to engage the screw-threaded center opening of the tool-holding plate, and also near its center to receive a screw-threaded chuck-clamping nut having inclined surfaces, which by the longitudinal adjustment of the said nut on the said sleeve closes the spring-jaws of the chuck or permits the said jaws to open. The chuck, made as a tube, has at one end a conical head split to form three, or it may be more, jaws, and the rear end of the tube extended into the said sleeve is connected therewith by external threads of the tube engaging internal threads of the sleeve.

The tool-holding plate herein shown, instead of carrying the wire-holding chuck, may receive and rotate any of the tools shown in the said patent, or tools commonly used in that class of watch-makers' lathes.

Figure 1 represents in partial longitudinal section a watch-maker's lathe with my improvements added; Fig. 2, a right-hand-end view of the chuck and the spindle-carrying head; Fig. 3, a section on the line $x\,x$, looking toward the left; Fig. 4, a section on the line $x^2\,x^2$, looking in the same direction; Fig. 5, a detail of the sleeve; Fig. 6, a detail of the chuck-clamping nut, and Fig. 7 section of frictional washer to be placed between the clamping-cap and tool-holder.

The frame A of the lathe, of usual shape, has adjustably mounted upon it the head $A'$ and tail-stock $A^2$, and the tool-carriage $A^3$ for the tool-rest $A^4$, all of usual construction. The head $A'$ has suitable bearings to receive the hollow spindle $a$, having attached to it the cone-pulley $b$ and the head $b^2$. The head $b^2$ has a smooth front face, and about its periphery has an annular shoulder, 14, clearly shown in Fig. 1, which receives against it and forms a bearing for the annular internally-threaded clamping-nut $b^3$, which engages the externally-screw-threaded part of the clamping-cap $c$, the latter having a central opening to enable access to be had to the tool-holding plate $d$, and permit the latter to be moved and adjusted in the space between the said clamping-cap and the face of the head $b^2$. The head $b^2$ has a slot, 8, (see Fig. 1,) which receives a key, 2, carried by the clamping-cap $c$, and that prevents the cap from rotating on the said head.

The tool-holding plate $d$ is provided at its center with a screw-threaded opening, which, as herein shown, receives the screw-threaded part 3 of the sleeve $e$, it having a spanner-collar, 4, by which to turn it out and into the said plate. The sleeve $e$, in front of the collar 4, has a part, 6, provided with a left-hand thread, which receives upon it the chuck-clamping nut $f$, beveled internally at its front end to act upon the beveled part of the head of the wire-holding chuck $g$, the said head being split to form three or more spring-jaws, (marked 5 in Fig. 2.) The rear end of the wire-holding chuck $g$ is screw-threaded externally to fit screw-threads $t$ within the rear end of the sleeve $e$, and at its front end the said sleeve is beveled, as at 12, to correspond with the head $n$ of the nut $f$, and to form a seat for the holding-chuck $g$ before the said nut is turned outward, to act upon and close the chuck on the wire or thing to be held. The left-hand thread 6 enables the nut $f$ to be rotated and moved outward on the chuck tightly without loosening the sleeve or the chuck. Between the outer side of the plate $d$ and the inner side of the clamping-cap $c$, I interpose a spring-washer, $h$. (Shown separately in Fig. 7 in edge view.) This washer is so shaped as to exert sufficient friction on the plate $d$, when the clamping-cap $c$ is partially drawn back in the head by the clamping-nut $b^3$, as to hold the said plate in the position into which it is moved or placed when adjusting it centrally in usual manner; but when the said plate and the tool carried by it have been adjusted into central position, the said plate will be firmly clamped and held in such position by a further movement of the nut $b^3$, after which the lathe will be ready for use. The further inward movement of the clamping-cap $c$, as stated, clamps the plate tightly between it and the head, and forces the plate closely toward and against the face of the head $b^2$, by which it is rotated by frictional contact, which plan is more desirable in the practical working of the lathe than the plan wherein the plate $d$ is forced outward by the pressure of the screw in the spindle against the cap, leaving the holding-plate pivoted upon the point thereof, as in the patent referred to. Outward pressure against the cap $c$, as in the said patent, is objectionable because of its liability to spring the plate and cap outward from the head, and where a jewel-hole is to be centered by the tail-spindle acting as a "pump-center," it would be liable to break or crack the jewel, in clamping it in position, before the center could be removed. The holding-plate is also liable to be thrown out of true position, not only by the springing of the plate and cap, but by the frictional spring which, is placed between the clamping-screw in the spindle and the holding-plate, so as to keep it against the cap, which is liable to yield back or allow the plate to rock when a piece of work is being centered by holding a guide against it while rotating, or where the center of a pivot-hole is to be found, either with the center in tail-spindle or a hand-tool. By keeping the holding-plate $d$ always in contact with the head $b^2$, this yielding is prevented, as the whole surface of the plate bears upon the solid surface of the head, instead of the end of a screw or a spring carried upon it, and is held firmly in place by the spring-washer $h$, which bears upon the outer surface of the plate instead of the center, and by this means a long piece of wire or work may be used and properly centered.

The sleeve $e$ and chuck $g$ may be removed from the plate $d$, and the Kesselmeier or other chuck may be used in their place.

I claim—

1. The hollow spindle, its head $b^2$, the tool-holding plate, and the screw-threaded clamping-cap, combined with the clamping-nut held loosely on the said head and made to engage screw-threads on the cap, whereby the latter may be made to press the tool-holding plate firmly against the said head, to be rotated by it, substantially as described.

2. The hollow spindle, its head $b^2$, the loosely-held clamping-nut thereon, the clamping-cap, and the tool-holding plate, combined with the spring-washer interposed between the said cap and plate, substantially as and for the purpose set forth.

3. The sleeve and the wire-holding chuck having the jaws 5, combined with the adjustable chuck-clamping nut $f$, placed on the said sleeve, and with the plate $d$, substantially as and for the purpose described.

4. In combination, the sleeve, the wire-holding chuck screwed therein, the adjustable chuck-clamping nut $f$, placed on the sleeve, the plate $d$, into which the sleeve is screwed, the rotating hollow spindle, its head, the loose clamping-nut $b^3$, and the screw-threaded clamping-cap operated by the said loose nut, substantially as shown, and for the purpose described.

In testimony whereof I have signed my name to this specification in the presence of two subscribing witnesses.

SYLVANUS SAWYER.

Witnesses:
G. W. GREGORY,
W. H. SIGSTON.